(12) United States Patent
Jiang et al.

(10) Patent No.: US 8,574,393 B2
(45) Date of Patent: *Nov. 5, 2013

(54) METHOD FOR MAKING TOUCH PANEL (75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1031 days.

This patent is subject to a terminal disclaimer.

(21) Appl. No.: 12/286,195

(22) Filed: Sep. 29, 2008

(65) Prior Publication Data
US 2009/0160799 A1    Jun. 25, 2009

(30) Foreign Application Priority Data
Dec. 21, 2007    (CN) .......................... 2007 1 0125404

(51) Int. Cl.
B29C 65/02    (2006.01)

(52) U.S. Cl.
USPC .............................. 156/311; 345/173; 445/24

(58) Field of Classification Search
USPC .......... 156/281, 247, 305, 298, 311; 977/742; 445/24; 345/174, 173
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,223,120 A * | 6/1993 | Kojima et al. | 205/317 |
| 5,853,877 A | 12/1998 | Shibuta | |
| 5,861,583 A | 1/1999 | Schediwy et al. | |
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |

(Continued)

FOREIGN PATENT DOCUMENTS

| | | |
|---|---|---|
| CN | 2539375 | 3/2003 |
| CN | 1447279 | 10/2003 |

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003, 32(8)(lines from the 4th line to 35th line in the right column of p. 507 may be relevant).

(Continued)

*Primary Examiner* — Yogendra Gupta
*Assistant Examiner* — Vishal I Patel
(74) *Attorney, Agent, or Firm* — Altis & Wispro Law Group, Inc.

(57) ABSTRACT

An exemplary method for making a touch panel includes the steps of: providing a flexible substrate; fabricating a carbon nanotube film; laying the carbon nanotube film to form a carbon nanotube layer stacked on the flexible substrate; heat-pressing the carbon nanotube layer of the flexible substrate; and separately forming at least two electrodes on a surface of the carbon nanotube layer, thereby forming the touch panel.

18 Claims, 5 Drawing Sheets

(56) References Cited

U.S. PATENT DOCUMENTS

| | | | |
|---|---|---|---|
| 6,947,203 B2 | 9/2005 | Kanbe | |
| 7,054,064 B2 | 5/2006 | Jiang et al. | |
| 7,060,241 B2 | 6/2006 | Glatkowski | |
| 7,068,261 B2 * | 6/2006 | Kubo et al. | 345/173 |
| 7,071,927 B2 | 7/2006 | Blanchard | |
| 7,084,933 B2 | 8/2006 | Oh et al. | |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,355,592 B2 | 4/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 8,048,256 B2 * | 11/2011 | Feng et al. | 156/305 |
| 8,105,126 B2 * | 1/2012 | Jiang et al. | 445/24 |
| 2002/0089492 A1 | 7/2002 | Ahn et al. | |
| 2003/0122800 A1 | 7/2003 | Yu | |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 * | 3/2004 | Jiang et al. | 502/182 |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kawase et al. | |
| 2005/0209392 A1 * | 9/2005 | Luo et al. | 524/496 |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0061704 A1 | 3/2006 | Hayano et al. | |
| 2006/0073089 A1 * | 4/2006 | Ajayan et al. | 423/447.2 |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 * | 12/2006 | Spath et al. | 345/173 |
| 2006/0274049 A1 | 12/2006 | Spath et al. | |
| 2006/0275956 A1 * | 12/2006 | Konesky | 438/128 |
| 2006/0278444 A1 | 12/2006 | Binstead | |
| 2006/0292360 A1 * | 12/2006 | Hays et al. | 428/323 |
| 2007/0065651 A1 * | 3/2007 | Glatkowski et al. | 428/297.4 |
| 2007/0075619 A1 | 4/2007 | Jiang et al. | |
| 2007/0081681 A1 | 4/2007 | Yu et al. | |
| 2007/0085838 A1 | 4/2007 | Ricks et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0007535 A1 | 1/2008 | Li | |
| 2008/0018012 A1 * | 1/2008 | Lemaire et al. | 264/82 |
| 2008/0029292 A1 | 2/2008 | Takayama et al. | |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0192014 A1 | 8/2008 | Kent et al. | |
| 2008/0238882 A1 | 10/2008 | Sivarajan et al. | |
| 2008/0248235 A1 | 10/2008 | Feng et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0153513 A1 | 6/2009 | Liu et al. | |
| 2009/0153514 A1 | 6/2009 | Jiang et al. | |
| 2009/0153516 A1 | 6/2009 | Liu et al. | |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |
| 2012/0105371 A1 | 5/2012 | Hotelling et al. | |

FOREIGN PATENT DOCUMENTS

| | | |
|---|---|---|
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | 61-283918 | 12/1986 |
| JP | S62-63332 | 3/1987 |
| JP | 62-139028 | 6/1987 |

(56) References Cited

FOREIGN PATENT DOCUMENTS

| | | |
|---|---|---|
| JP | S62-182916 | 8/1987 |
| JP | S62-190524 | 8/1987 |
| JP | 1-214919 | 8/1989 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 1995-28598 | 1/1995 |
| JP | 8-287775 | 11/1996 |
| JP | H10-63404 | 3/1998 |
| JP | 10-246605 | 9/1998 |
| JP | 2001-34419 | 2/2001 |
| JP | 2001-267782 | 9/2001 |
| JP | 2002519754 | 7/2002 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2006-330883 | 12/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | I287669 | 10/2007 |
| TW | 200926471 | 6/2009 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.

Fan et al. "Self-Oriented Regular Arrays of Carbon Nanotubes and Their Field Emission Properties". Science, vol. 283, (1999);pp. 512-514.

Susuki et al. "Investigation of physical and electric properties of silver pastes as binder for thermoelectric materials". Review of Scientific Instruments,76,(2005);pp. 023907-1 to 023907-5.

Wu et al."Transparent, Conductive Carbon Nanotube Films". Science,vol. 305,(2004);pp. 1273-1276.

ASM Handbook."vol. 2 Properties and Selection: Nonferrous Alloys and Special-Purpose Materials".Apr. 2007; pp. 840-853.

George Gruner, "Carbon Nanonets Spark New Electronics", Scientific American, pp. 76-83, May 2007.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Mei Zhang etal., "Strong Transparent, Multifunctional, Carbon Nanotube Sheets", Science, America, AAAS, vol. 309, pp. 1215-1219, Aug. 19, 2005.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

(56) References Cited

OTHER PUBLICATIONS

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

R Colin Johnson, "Carbon nanotubes aim for cheap, durable touch screens", Aug. 2007 http://psroc.phys.ntu.edu.tw/bimonth/v27/615.pdf.

Xianglin Liu, "strong, transparent, multifunctional carbon nanotube sheets", pp. 720-721,Oct. 2005. http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

Zhungchun Wu et al., "Transparent, Conductive Carbon Nanotube Films", Science, vol. 305, pp. 1273-1276, Aug. 27, 2004.

\* cited by examiner

METHOD FOR MAKING TOUCH PANEL

RELATED APPLICATIONS

This application claims all benefits accruing under 35 U.S.C. §119 from China Patent Application No. 200710125404.3, filed on 2007/12/21 in the China Intellectual Property Office, the disclosure of which is incorporated herein by reference. This application is related to commonly-assigned applications entitled, "TOUCH PANEL", 12/286,266, filed on Sep. 29, 2008; "TOUCH PANEL AND DISPLAY DEVICE USING THE SAME", 12/286,181, filed on Sep. 29, 2008; "TOUCH PANEL AND DISPLAY DEVICE USING THE SAME", 12/286,154, filed on Sep. 29, 2008; "TOUCH PANEL AND DISPLAY DEVICE USING THE SAME", 12/286,189, filed on Sep. 29, 2008; "TOUCH PANEL AND DISPLAY DEVICE USING THE SAME", 12/286,176, filed on Sep. 29, 2008; "ELECTRONIC ELEMENT HAVING CARBON NANOTUBES", 12/286,143, filed on Sep. 29, 2008; "TOUCH PANEL AND DISPLAY DEVICE USING THE SAME", 12/286,166, filed on Sep. 29, 2008; "TOUCH PANEL AND DISPLAY DEVICE USING THE SAME", 12/286,178 filed on Sep. 29, 2008; "TOUCH PANEL AND DISPLAY DEVICE USING THE SAME", 12/286,148, filed on Sep. 29, 2008; "TOUCHABLE CONTROL DEVICE", 12/286,140, filed on Sep. 29, 2008; "TOUCH PANEL AND DISPLAY DEVICE USING THE SAME", 12/286,146, filed on Sep. 29, 2008; "TOUCH PANEL AND DISPLAY DEVICE USING THE SAME", 12/286,216, filed on Sep. 29, 2008; "TOUCH PANEL AND DISPLAY DEVICE USING THE SAME", 12/286,152, filed on Sep. 29, 2008; "TOUCH PANEL AND DISPLAY DEVICE USING THE SAME", 12/286,145, filed on Sep. 29, 2008; "TOUCH PANEL, METHOD FOR MAKING THE SAME, AND DISPLAY DEVICE ADOPTING THE SAME", 12/286,155, filed on Sep. 29, 2008; "TOUCH PANEL AND DISPLAY DEVICE USING THE SAME", 12/286,179, filed on Sep. 29, 2008; "TOUCH PANEL, METHOD FOR MAKING THE SAME, AND DISPLAY DEVICE ADOPTING THE SAME", 12/286,228, filed on Sep. 29, 2008; "TOUCH PANEL AND DISPLAY DEVICE USING THE SAME", 12/286,153, filed on Sep. 29, 2008; "TOUCH PANEL AND DISPLAY DEVICE USING THE SAME", 12/286,184, filed on Sep. 29, 2008; "METHOD FOR MAKING TOUCH PANEL", 12/286,175, filed on Sep. 29, 2008; "TOUCH PANEL", 12/286,141, filed on Sep. 29, 2008; "TOUCH PANEL AND DISPLAY DEVICE USING THE SAME", 12/286,160, filed on Sep. 29, 2008; "TOUCH PANEL AND DISPLAY DEVICE USING THE SAME", 12/286,220, filed on Sep. 29, 2008; "TOUCH PANEL AND DISPLAY DEVICE USING THE SAME", 12/286,227, filed on Sep. 29, 2008; "TOUCH PANEL AND DISPLAY DEVICE USING THE SAME", 12/286,144, filed on Sep. 29, 2008; "TOUCH PANEL AND DISPLAY DEVICE USING THE SAME", 12/286,218, filed on Sep. 29, 2008; "TOUCH PANEL AND DISPLAY DEVICE USING THE SAME", 12/286,142, filed on Sep. 29, 2008; "TOUCH PANEL AND DISPLAY DEVICE USING THE SAME", 12/286,241, filed on Sep. 29, 2008; "TOUCH PANEL, METHOD FOR MAKING THE SAME, AND DISPLAY DEVICE ADOPTING THE SAME", 12/286,151, filed on Sep. 29, 2008; and "TOUCH PANEL, METHOD FOR MAKING THE SAME, AND DISPLAY DEVICE ADOPTING THE SAME", 12/286,219, filed on Sep. 29, 2008. The disclosures of the above-identified applications are incorporated herein by reference.

BACKGROUND

1. Field of the Invention

The present invention relates to methods for making touch panels and, particularly, to a method for making a flexible touch panel.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., a display such as a liquid crystal panel). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including resistance, capacitance, infrared, and surface sound-wave types, have been developed. The capacitance-type touch panel has advantages such as higher accuracy and excellent transparency, and thus has been widely used.

A conventional capacitance-type touch panel includes a glass substrate, a transparent conductive layer, and four electrodes. The material of the transparent conductive layer is selected from a group consisting of indium tin oxide (ITO) and antimony tin oxide (ATO). The electrodes are made of metal, and are separately formed on a surface of the transparent conductive layer. Further, a protective layer is formed on the surface of the transparent conductive layer that faces away from the substrate. The material of the protective layer has insulative and transparent characteristics.

In operation, an upper surface of the touch panel is pressed/touched with a touch tool, such as a user's finger or an electrical pen/stylus. Visual observation of a screen on the liquid crystal display device provided on a back side of the touch panel is possible. In use, because of an electrical field of the user, a coupling capacitance forms between the user and the transparent conductive layer. For high frequency electrical current, the coupled capacitance is a conductor, and thus the touch tool takes away a little current from the touch point. Current flowing through the four electrodes cooperatively replaces the current lost at the touch point. The quantity of current supplied by the four electrodes is directly proportional to the distances from the touch point to the electrodes. A touch panel controller is used to calculate the proportion of the four supplied currents, thereby detecting coordinates of the touch point on the touch panel.

Ordinary touch panels are not flexible because they have a glass substrate. However, the demand for flexible display devices is increasing. Additionally, the optically transparent conductive layer of a typical touch panel is an ITO layer. The ITO layer is generally formed by means of ion-beam sputtering, and this method is relatively complicated. Furthermore, the ITO layer has generally poor mechanical durability, low chemical endurance, and uneven resistance over an entire area of the touch panel. Moreover, the ITO layer has relatively low transparency. All the above-mentioned problems of the ITO layer tend to yield a touch panel with low sensitivity, accuracy, and brightness.

What is needed, therefore, is to provide a method for easily manufacturing a touch panel that is flexible, low-cost, and has good performance characteristics.

SUMMARY

A method for making a touch panel includes: providing a flexible substrate; fabricating at least one carbon nanotube film; forming a carbon nanotube layer on the flexible substrate; heat-pressing the carbon nanotube layer of the flexible substrate; and separately forming at least two electrodes on a surface of the carbon nanotube layer, thereby forming the touch panel.

Other advantages and novel features of the present method for making a touch panel will become more apparent from the following detailed description of the present embodiments, when taken in conjunction with the accompanying drawings.

BRIEF DESCRIPTION OF THE DRAWINGS

Many aspects of the present method for making a touch panel can be better understood with reference to the following drawings. The components in any drawing are not necessarily to scale, the emphasis instead being placed upon clearly illustrating the principles of the present method for making a touch panel.

The exemplifications set out herein illustrate at least one embodiment of the present method for making a touch panel, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present method for making a touch panel.

Figure 1:
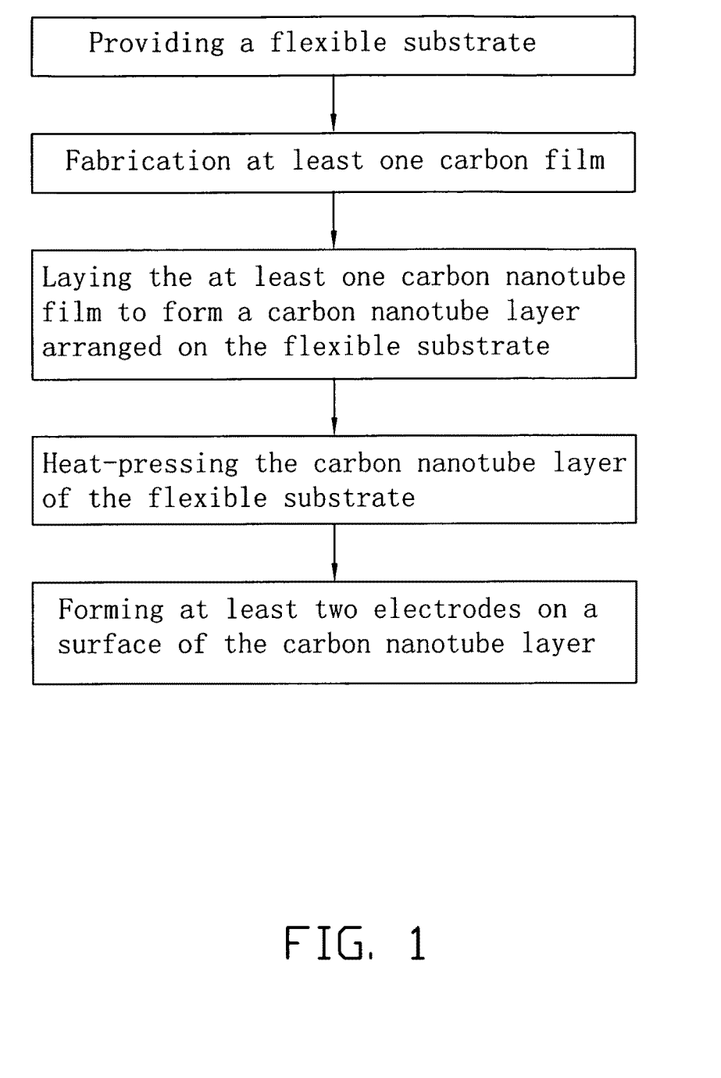
FIG. 1 is a flow chart of a method for making a touch panel, in accordance with a present embodiment.

Referring to FIG. 1, a method for making a touch panel according to one embodiment of the present invention is summarized. The method includes: (a) providing a flexible substrate; (b) fabricating at least one carbon nanotube film; (c) laying the at least one carbon nanotube film to form a carbon nanotube layer arranged on the flexible substrate; (d) heat-pressing the carbon nanotube layer of the flexible substrate; and (e) forming at least two electrodes on a surface of the carbon nanotube layer, thereby obtaining the touch panel.

In step (a), the flexible substrate has a thickness in an approximate range from 0.01 millimeters to 1 centimeter. The substrate is made of flexible transparent materials (e.g., plastics, resin). The flexible material is selected from the group consisting of polycarbonate (PC), polymethyl methacrylate (PMMA), polyethylene terephthalate (PET), polyethersulfone (PES), polyimide (PI), cellulose ester, acrylic resin, benzocyclobutene (BCB), and poly vinyl chloride (PVC). In the exemplary embodiment, the flexible substrate is made of PET film. The thickness, width, and length of the exemplary PET film are respectively 2 millimeters, 20 centimeters, and 30 centimeters.

In step (b), a method for fabricating each carbon nanotube film includes the steps of: (b1) providing an array of carbon nanotubes, such as a super-aligned array of carbon nanotubes; and (b2) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (b1), a given super-aligned array of carbon nanotubes can be formed by the substeps of: (b11) providing a substantially flat and smooth substrate; (b12) forming a catalyst layer on the substrate; (b13) annealing the substrate with the catalyst layer in air at a temperature in the approximate range from 700° C. to 900° C. for about 30 to 90 minutes; (b14) heating the substrate with the catalyst layer to a temperature in the approximate range from 500° C. to 740° C. in a furnace with a protective gas therein; and (b15) supplying a carbon source gas to the furnace for about 5 to 30 minutes and growing the super-aligned array of carbon nanotubes on the substrate.

In step (b11), the substrate can be a P-type silicon wafer, an N-type silicon wafer, or a silicon wafer with a film of silicon dioxide thereon. A 4-inch P-type silicon wafer is used as the substrate in the present embodiment.

In step (b12), the catalyst can be made of iron (Fe), cobalt (Co), nickel (Ni), or any alloy thereof.

In step (b14), the protective gas can be made up of at least one of nitrogen ($N_2$), ammonia ($NH_3$), and a noble gas. In step (b15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array of carbon nanotubes includes a plurality of carbon nanotubes parallel to each other and approximately perpendicular to the substrate. The carbon nanotubes in the array can be single-walled carbon nanotubes, double-walled carbon nanotubes, or multi-walled carbon nanotubes. Diameters of the single-walled carbon nanotubes are in the approximate range from 0.5 to 10 nanometers. Diameters of the double-walled carbon nanotubes are in the approximate range from 1 nanometer to 50 nanometers. Diameters of the multi-walled carbon nanotubes are in the approximate range from 5 to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (b2), the carbon nanotube film can be formed by the substeps of: (b21) selecting one or more carbon nanotubes having a predetermined width from the array of carbon nanotubes; and (b22) pulling the carbon nanotubes to form nanotube segments at an even/uniform speed to achieve a uniform carbon nanotube film.

In step (b21), quite usefully, the carbon nanotube segment includes a plurality of carbon nanotubes parallel to each other. The carbon nanotube segments can be selected by using an adhesive tape as the tool to contact the super-aligned array of carbon nanotubes. In step (b22), the pulling direction is substantially perpendicular to the growing direction of the super-aligned array of carbon nanotubes.

Figure 2:
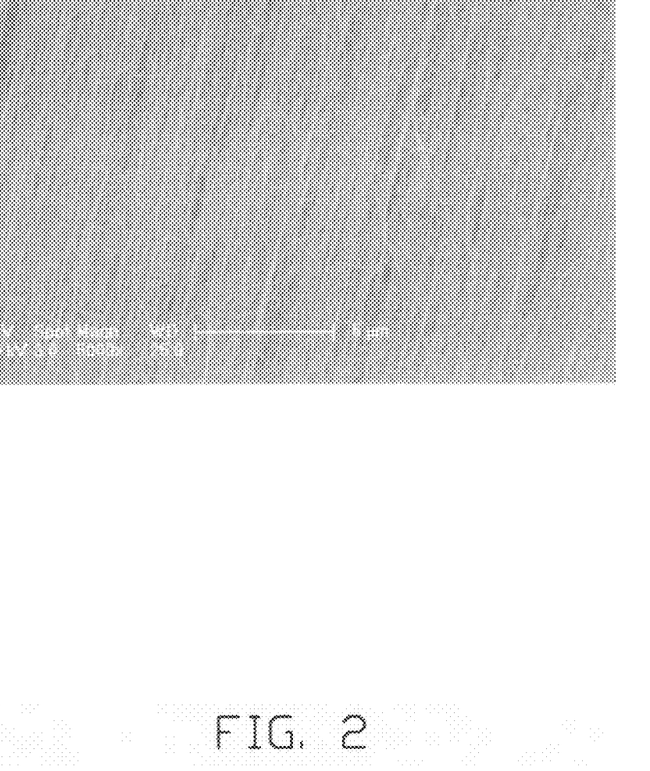
FIG. 2 shows a Scanning Electron Microscope (SEM) image of a carbon nanotube film of a transparent conductive layer used in the touch panel manufactured according to the method of FIG. 1.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 2, the carbon nanotube film includes a plurality of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

Figure 3:
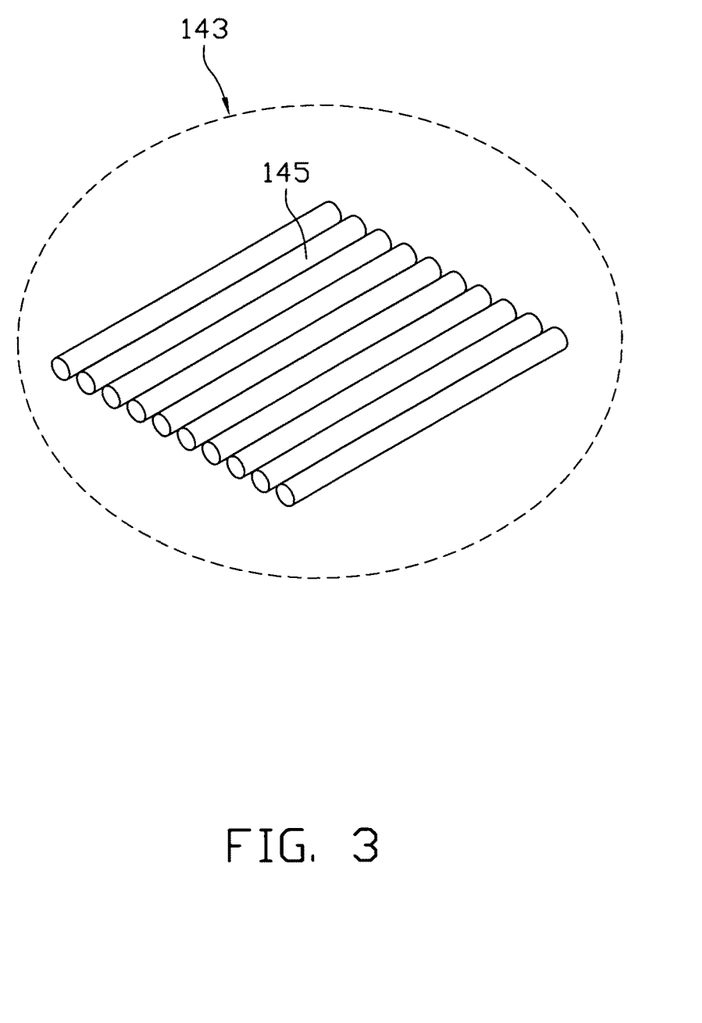
FIG. 3 is a structural schematic of a carbon nanotube segment.

Referring to FIG. 3, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation.

The width of the carbon nanotube film depends on a size of the carbon nanotube array. The length of the carbon nanotube film can be arbitrarily set, as desired. In one useful embodiment, when the substrate is a 4-inch P-type silicon wafer, the width of the carbon nanotube film is in an approximate range from 0.5 nanometers to 10 centimeters, and the thickness of the carbon nanotube film is in the approximate range from 0.5 nanometers to 100 micrometers. In such embodiment, two carbon nanotube films can be obtained and contactingly disposed side by side on the PET film that forms the flexible substrate in the above-described exemplary embodiment. The carbon nanotubes in the carbon nanotube film can be selected from a group consisting of single-walled carbon nanotubes, double-walled carbon nanotubes, and multi-walled carbon nanotubes. Diameters of the single-walled carbon nanotubes are in an approximate range from 0.5 nanometers to 50 nanometers. Diameters of the double-walled carbon nanotube are in an approximate range from 1 nanometer to 50 nanometers. Diameters of the multi-walled carbon nanotube are in an approximate range from 1.5 nanometers to 50 nanometers.

Unlike previous methods for making an ITO film, the present method does not require a vacuum environment and heat processing, due to each carbon nanotube film being obtained by pulling out from an array of carbon nanotubes. Thus, the carbon nanotube layer formed by the at least one carbon nanotube film and used as a transparent conductive layer of the touch panel has the advantage of being low cost, environmentally safe, and energy efficient.

In step (c), the carbon nanotube layer includes a plurality of oriented carbon nanotubes. In the present embodiment, the carbon nanotube layer is a single carbon nanotube film or a plurality of (e.g. two) carbon nanotube films contactingly disposed side by side. The carbon nanotubes of each carbon nanotube film are parallel to the pulling direction. Moreover, the carbon nanotube layer can include at least two carbon nanotube films stacked one on the other. In such case, an angle between the alignment directions of the carbon nanotubes in any two adjacent carbon nanotube films is in a range from 0° to less than or equal to 90°. The placing the films at an angle helps increase the strength of the overall structure. Having the films aligned will increase the efficiently of the transmission.

It is noted that each carbon nanotube film obtained in step (b) is adherent in nature, because the carbon nanotubes in the super-aligned carbon nanotube array have a high purity and a high specific surface area. As such, the carbon nanotube film can be adhered directly to a surface of the flexible substrate, and/or to another carbon nanotube film without the use of an adhesive. In the alternative, other bonding means can be applied.

In the present embodiments, step (c) involves the laying of a single carbon nanotube film, contactingly laying at least two carbon nanotube films side by side, or stacking at least two carbon nanotube films on a surface of the flexible substrate, so as to form the carbon nanotube layer. The carbon nanotube films comprise of carbon nanotubes with a primary orientation and adjacent two carbon nanotube films are disposed with an angle α between their primary orientations. The angle α is greater than 0° and up to 90°.

Certain embodiments of step (c) include the substeps of: (c1) laying a carbon nanotube film, contactingly laying at least two carbon nanotube films side by side, or stacking at least two carbon nanotube films on each other on a surface of a supporter; (c2) removing the supporter to form a freestanding carbon nanotube film structure; and (c3) applying the freestanding carbon nanotube film structure on a surface of the flexible substrate, thereby obtaining the carbon nanotube layer.

In step (c1), the supporter is a substrate or a frame. Because of each carbon nanotube film's adhesive nature, the carbon nanotube film naturally adheres to the supporter. It is to be noted that a cutting tool, such as a knife or laser, can be used to cut the carbon nanotube film, so that the carbon nanotube film has the same size as the supporter.

Any or all of each carbon nanotube film, the carbon nanotube film structure, or the carbon nanotube layer, can be treated with an organic solvent. Specifically, the carbon nanotube film, the carbon nanotube film structure, or the carbon nanotube layer can be treated by applying the organic solvent onto the carbon nanotube film, the carbon nanotube film structure, or the carbon nanotube layer to soak the entire surface thereof. Alternatively, the carbon nanotube film, the carbon nanotube film structure, or the carbon nanotube layer can be put into a container, which is filled with the organic solvent. The organic solvent is volatile and can be selected from the group consisting of ethanol, methanol, acetone, dichloroethane, chloroform, any appropriate mixture thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will come into contact with the substrate after the organic solvent treatment due to the surface tension of the organic solvent. Then the contacting area of the carbon nanotube film with the substrate will increase, and thus, the carbon nanotube film can more firmly adhere to the surface of the substrate. In another aspect, due to the decrease of the specific surface area via bundling, the mechanical strength and toughness of the carbon nanotube film are increased. Macroscopically, the film will be an approximately uniform carbon nanotube film.

Moreover, a step of cleaning the flexible substrate and coating it with low melting point material can be executed before step (c). An organic solvent is used to clean the flexible substrate. The organic solvent is selected from ethanol, methanol, and acetone. Any contaminants on the flexible substrate are removed in the cleaning step. A sputtering method or a spraying method is used to coat the low melting point material on the flexible substrate. The melting point of the low melting point material is lower than that of the flexible substrate and lower than that of the carbon nanotube layer.

The low melting point material is, for example, polymethyl methacrylate (PMMA). In the present embodiment, PMMA is uniformly coated onto a surface of the flexible substrate.

Figure 4:
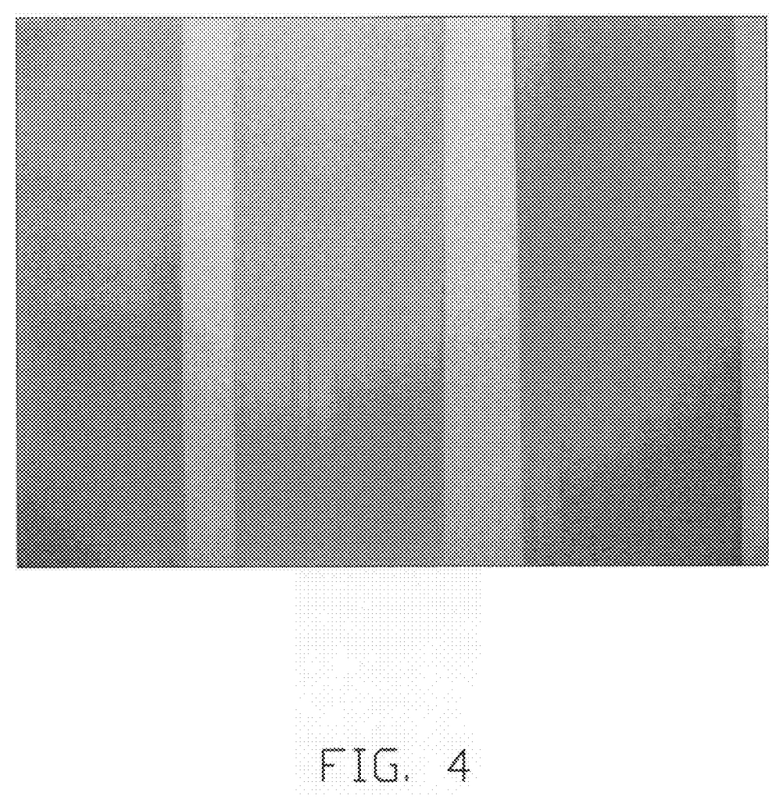
FIG. 4 is a photo of a heat-pressed carbon nanotube layer of the touch panel manufactured according to the method of FIG. 1.
Figure 5:
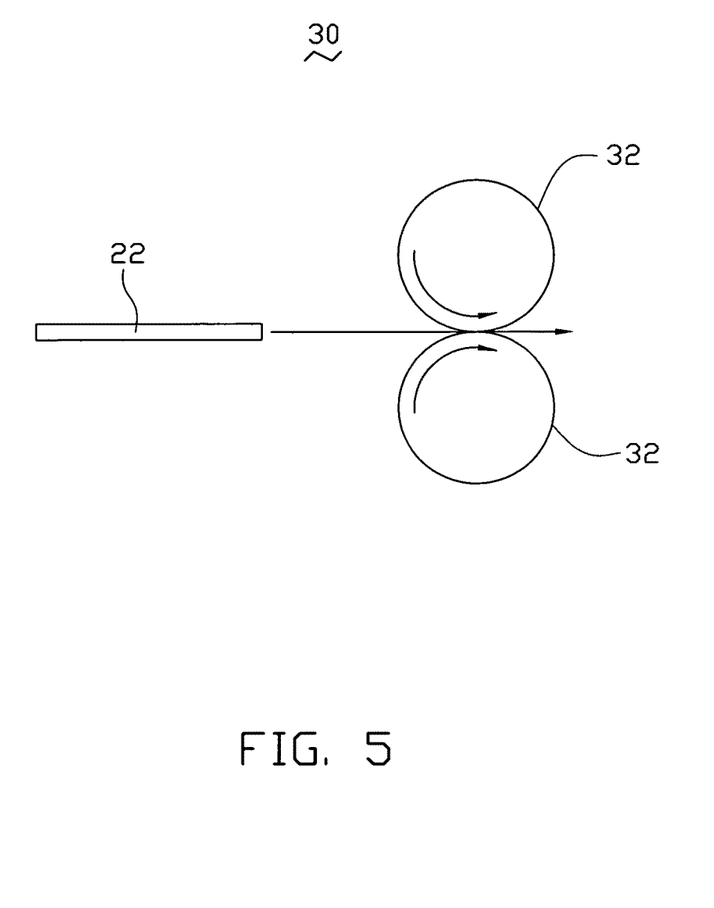
FIG. 5 shows a schematic view of a heat-pressing process for the carbon nanotube layer of the touch panel manufactured according to the method of FIG. 1.

Referring to FIGS. 4 and 5, step (d) is carried out by a hot-press device 30, and specifically includes the substeps of: (d1) disposing the flexible substrate 22 coated with a carbon nanotube layer on the hot-press device 30; (d2) heating a pressing device of the hot-press device 30; and (d3) applying heat and pressure to the flexible substrate 22 by the pressing device 32.

In step (d1), the hot-press device 30 includes a pressing device (not labeled) and a heating device (not shown). In the present embodiment, the hot-press device 30 is a hot-press machine, and the pressing device includes two rollers 32.

In step (d2), the heating device is used to heat the pressing device. A temperature of the pressing device is in an approximate range from 110° C. to 120° C.

In step (d3), the flexible substrate 22 coated with the carbon nanotube layer is slowly passed through the pressing device 32. The speed of the flexible substrate 22 is in the range from about 1 millimeter per minute to 10 meters per minute. In the present embodiment, a certain pressure is applied to the flexible substrate 22 by the heated rollers 32, in order to soften the flexible substrate 22. As such, air between the carbon nanotube layer and the flexible substrate 22 is pressed out of the flexible substrate 22, and the carbon nanotube layer firmly adheres on the surface of the flexible substrate 22.

It is to be noted that when the low melting point material is sandwiched between the flexible substrate 22 and the carbon nanotube layer, in the process of pressing the flexible substrate 22, the carbon nanotube layer is adhered to the flexible substrate 22 by the low melting point material.

In step (e), the electrodes are adhered to the carbon nanotube layer by a silver-based slurry. The electrodes are strip-shaped, and can be formed by metallic layers, conductive resin layers, carbon nanotube films or any other suitable materials. The electrodes are disposed on a surface that faces away from the flexible substrate 22. The electrodes are formed by one or more of spraying, electrical deposition, and electroless deposition methods. The electrodes can alternatively be disposed between the carbon nanotube layer and the flexible substrate 22, provided that the electrodes are electrically connected with the carbon nanotube layer.

Furthermore, in order to prolong operational life span and restrict coupling capacitance of the touch panel, a transparent protective film can be disposed on the electrodes and the transparent conductive layer (i.e., the carbon nanotube layer). The material of the transparent protective film can be selected from a group consisting of silicon nitride, silicon dioxide, benzocyclobutenes, polyester film, and polyethylene terephthalate. The transparent protective film can be a plastic film and receives a surface hardening treatment to protect the electrodes and the transparent conductive layer from being scratched, when in use.

In the present embodiment, the transparent protective film is silicon dioxide. The hardness and thickness of the transparent protective film are selected according to practical needs. The transparent protective film is adhered to the transparent conductive layer at least, and may be also adhered to the electrodes.

The touch panel can further include a shielding layer disposed on a surface of the flexible substrate that faces away from the carbon nanotube layer. The material of the shielding layer can be indium tin oxide, antimony tin oxide, carbon nanotube film, and/or another conductive material or materials. In the present embodiment, the shielding layer is a carbon nanotube film. The carbon nanotube film includes a plurality of carbon nanotubes, and the orientation(s) of the carbon nanotubes therein may be arbitrarily determined. In one embodiment, the carbon nanotubes in the carbon nanotube film are arranged parallel to a same direction. The carbon nanotube film is connected to ground and acts as shielding, thus enabling the touch panel to operate without interference, (e.g., electromagnetic interference).

Compared with conventional methods for making a touch panel, the present method for making a touch panel has at least the following advantages. Firstly, because the carbon nanotube layer has superior toughness, high mechanical strength, and uniform conductivity, the carbon nanotube layer can be used as a transparent conductive layer. Furthermore, the flexible substrate yields a flexible touch panel, which can be applied to a flexible display element. Secondly, the pulling method for fabricating the carbon nanotube film is simple, and the adhesive carbon nanotube film can be directly disposed on the flexible substrate. The method for fabricating the carbon nanotube film does not require a vacuum environment and a heating process. As such, the touch panel produced by the present method has advantages such as being low cost, environmentally safe, and energy efficient. Thirdly, the carbon nanotube layer and the flexible substrate are attached together by a hot-press process. Thus, the present method reduces the cost of the touch panel and simplifies the fabrication process. Furthermore, the hot-press process is performed at a relatively low temperature. Therefore a wide range of materials are available for use as the flexible substrate.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A method for making a touch panel, the method comprising:
   providing a flexible substrate of the touch panel;
   placing at least one previously fabricated free-standing carbon nanotube film consisting of carbon nanotubes on the flexible substrate of the touch panel to form a carbon nanotube layer on the flexible substrate of the touch panel;
   heat-pressing the carbon nanotube layer on the flexible substrate of the touch panel; and forming at least two electrodes in contact with the carbon nanotube layer to achieve the touch panel.

2. The method as claimed in claim 1, wherein the placing the at least one previously fabricated carbon nanotube film on the flexible substrate of the touch panel comprises at least one step of:
   contactingly laying at least two previously fabricated free-standing carbon nanotube films on the flexible substrate of the touch panel, and
   stacking at least two previously fabricated free-standing carbon nanotube films on each other on the flexible substrate of the touch panel.

3. The method as claimed in claim 2, wherein each of the at least two previously fabricated free-standing carbon nanotube films comprises carbon nanotubes with a primary orientation and adjacent two previously fabricated free-standing carbon nanotube films are placed with an angle α between their primary orientations, the angle α is greater than 0° and up to 90°.

4. The method as claimed in claim 1, wherein before the placing the at least one previously fabricated free-standing carbon nanotube film on the flexible substrate of the touch panel, the method further comprises coating a low melting point material on a surface of the flexible substrate of the touch panel to have the at least one previously fabricated free-standing carbon nanotube film placed thereon.

5. The method as claimed in claim 4, wherein a melting point of the low melting point material is lower than a melting point of the flexible substrate of the touch panel and a melting point of the carbon nanotube layer.

6. The method as claimed in claim 1, further comprising using an organic solvent to treat one of the at least one carbon nanotube film and the carbon nanotube layer.

7. The method as claimed in claim 1, wherein the heat-pressing the carbon nanotube layer comprises:
  disposing the flexible substrate of the touch panel with the carbon nanotube layer in a hot-pressed device;
  heating a pressing device of the hot-pressed device; and
  applying heat and pressure to the flexible substrate of the touch panel by the pressing device.

8. The method as claimed in claim 7, wherein the hot-pressed device is a hot-pressed machine, and the pressing device is two rollers.

9. The method as claimed in claim 1, further comprising applying a transparent protective film on a surface of the carbon nanotube layer.

10. The method as claimed in claim 9, wherein the transparent protective film is adhered to the surface of the carbon nanotube layer by an adhesive, and the adhesive is a silver-based slurry.

11. The method as claimed in claim 9, wherein the material of the transparent protective film is selected from silicon nitride, silicon dioxide, benzocyclobutenes, polyester film, and polyethylene terephthalate.

12. The method as claimed in claim 1, further comprising disposing a shielding layer on the flexible substrate of the touch panel.

13. The method as claimed in claim 12, wherein the material of the shielding layer is selected from the group consisting of indium tin oxide, antimony tin oxide, and carbon nanotube film.

14. The method as claimed in claim 12, wherein the shielding layer is adhered to a surface of the flexible substrate of the touch panel away from the carbon nanotube layer.

15. A method for making a touch panel, the method comprising:
  providing a flexible substrate of the touch panel;
  drawing at least one carbon nanotube film from a carbon nanotube array, the at least one carbon nanotube film consisting of untreated carbon nanotubes;
  laying the at least one carbon nanotube film on a surface of the flexible substrate of the touch panel to form a carbon nanotube layer on the flexible substrate of the touch panel;
  heat-pressing the carbon nanotube layer on the surface of the flexible substrate of the touch panel; and
  forming at least two electrodes in contact with the carbon nanotube layer to achieve the touch panel.

16. The method as claimed in claim 15, wherein the forming the at least two electrodes comprises forming four electrodes in directly contact with the carbon nanotube layer.

17. A method for making a touch panel, the method comprising:
  providing a flexible substrate of the touch panel and at least two previously fabricated free-standing carbon nanotube films consisting of carbon nanotubes, each of the at least two previously fabricated free-standing carbon nanotube films comprising a plurality of carbon nanotubes aligned along a same direction;
  stacking the at least two previously fabricated free-standing carbon nanotube films along different directions on the flexible substrate of the touch panel to form a carbon nanotube layer having the plurality of carbon nanotubes in adjacent two of the at least two previously fabricated carbon nanotube films aligned along different directions;
  heat-pressing the carbon nanotube layer on the flexible substrate of the touch panel; and forming at least two electrodes in contact with the carbon nanotube layer to achieve the touch panel.

18. The method as claimed in claim 1, wherein the at least one previously fabricated free-standing carbon nanotube film is fabricated by:
  providing an array of carbon nanotubes; and
  pulling out a carbon nanotube film from the array of carbon nanotubes by using a tool.

* * * * *